(12) United States Patent
Scheidt et al.

(10) Patent No.: US 12,534,055 B2
(45) Date of Patent: Jan. 27, 2026

(54) SYSTEM FOR BRAKING A DISPLACEMENT-CONTROLLED DRIVE SYSTEM

(71) Applicant: HYDAC FLUIDTECHNIK GMBH, Sulzbach/Saar (DE)

(72) Inventors: Michael Scheidt, Sulzbach (DE); Frank Schulz, Blieskastel-Bierbach (DE); Christian Stauch, Schwalbach (DE); Timo Ringle, Quierschied (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 420 days.

(21) Appl. No.: 17/925,389

(22) PCT Filed: May 7, 2021

(86) PCT No.: PCT/EP2021/062110
§ 371 (c)(1),
(2) Date: Nov. 15, 2022

(87) PCT Pub. No.: WO2021/233695
PCT Pub. Date: Nov. 25, 2021

(65) Prior Publication Data
US 2023/0182706 A1     Jun. 15, 2023

(30) Foreign Application Priority Data
May 16, 2020   (DE) .................... 10 2020 002 960.4

(51) Int. Cl.
*B60T 13/68*    (2006.01)
*B60T 15/02*    (2006.01)
(Continued)

(52) U.S. Cl.
CPC .......... *B60T 13/683* (2013.01); *B60T 15/027* (2013.01); *B60T 17/22* (2013.01);
(Continued)

(58) Field of Classification Search
CPC ...... B60T 13/683; B60T 15/027; B60T 17/22; F15B 13/0405; F15B 13/0433;
(Continued)

(56) References Cited

U.S. PATENT DOCUMENTS

| 4,132,153 A | 1/1979 | Grotness et al. |
| 4,437,385 A * | 3/1984 | Kramer .................... F15B 9/03 |
| | | 91/461 |

(Continued)

FOREIGN PATENT DOCUMENTS

| DE | 10 2005 040 322 | 4/2006 |
| DE | 103 40 504 | 8/2006 |

(Continued)

OTHER PUBLICATIONS

International Search Report (ISR) issued Aug. 26, 2021 in International (PCT) Application No. PCT/EP2021/062110.

*Primary Examiner* — Pamela Rodriguez
(74) *Attorney, Agent, or Firm* — Wenderoth, Lind & Ponack, L.L.P.

(57) ABSTRACT

A system is for braking a hydraulic working cylinder which is configured to be driven, for a motion, by an inflow pressure at an inflow end of the hydraulic working cylinder and an outflow pressure at an outflow end of the hydraulic working cylinder. The hydraulic working cylinder has no pump reversal. The system includes logic valves, and electro-proportionally actuatable control valves. The system is configured to control, by an electro-proportional adjustment of at least one of the logic valves, an outflow volume flow of the hydraulic working cylinder such that the outflow pressure is decoupled from the motion of the hydraulic working cylinder and coupled to the inflow pressure so as to lower the inflow pressure for the motion of the hydraulic working cylinder.

9 Claims, 7 Drawing Sheets

(51) Int. Cl.
   *B60T 17/22*   (2006.01)
   *F15B 13/04*   (2006.01)
(52) U.S. Cl.
   CPC .  *F15B 13/0405* (2013.01); *F15B 2211/30525*
       (2013.01); *F15B 2211/6313* (2013.01); *F15B*
                               *2211/665* (2013.01)
(58) Field of Classification Search
   CPC ........ F15B 2211/665; F15B 2211/6313; F15B
                  2211/30525; F15B 11/044; F15B
                  2211/3138; F15B 2211/40584; F15B
                  2211/413; F15B 2211/41527; F15B
                                           2211/46
   See application file for complete search history.

(56) References Cited

U.S. PATENT DOCUMENTS

| | | |
|---|---|---|
| 10,519,988 B2 | 12/2019 | Schneider et al. |
| 2005/0051025 A1 | 3/2005 | Nielsen et al. |
| 2006/0065867 A1 | 3/2006 | Vonderwell et al. |
| 2015/0135699 A1 | 5/2015 | Stephan et al. |
| 2020/0378409 A1* | 12/2020 | Bruck ................. F15B 13/0417 |

FOREIGN PATENT DOCUMENTS

| | | |
|---|---|---|
| DE | 10 2013 014 673 | 3/2015 |
| DE | 10 2014 016 642 | 5/2015 |
| EP | 2 320 094 | 5/2011 |

* cited by examiner

SYSTEM FOR BRAKING A DISPLACEMENT-CONTROLLED DRIVE SYSTEM

BACKGROUND OF THE INVENTION

1. Field of the Invention

The invention relates to a system for braking a displacement-controlled drive system, which can be driven by means of an inflow pressure and an outflow pressure at an inflow end and outflow end thereof, respectively.

2. Description of the Related Art

For positive displacement drive systems, such as hydraulic working cylinders that do not have pump reversing, brake valves have to be used when inertial loads are positioned. When the cylinder is installed vertically, any unintentional lowering of the load has to be prevented, which corresponds to the classic cases lowering brake and load holding. In case of a horizontal installation, a valve element is required, which permits the positioning of loads with high inertia by building up the outflow pressure. In both cases, when the cylinder is installed vertically and horizontally, standard load-holding lowering brake valves are used. DE 10 2013 014 673 A1 shows an example of such a valve element.

The use of these known valve elements has its disadvantages. Owing to the fixed control ratio between inflow and outflow during lowering, there is a conflict of objectives between stability and low-loss adjustment.

Lowering brake stop valves are always set to maximum load, which often does not occur in operation, resulting in unfavorable behavior in the application. In addition, the use of known valve elements is often complex because mechanical modifications have to be made to the valve elements.

Based on this prior art, the invention addresses the problem of providing a system for braking a displacement-controlled drive system that is characterized by an improved system behavior and enables an application-optimized adjustment of the braking behavior.

SUMMARY OF THE INVENTION

According to the invention, this problem is solved by a system having features described herein.

An essential feature of the invention is that by means of an electro-proportional adjustment of at least one valve element an outflow volume flow of the drive system is controlled such that the outflow pressure is decoupled from the motion of the drive system and can be freely preset and coupled to the inflow pressure, which can in that way be lowered to the extent necessary for the motion of the drive system. Because the inflow pressure and outflow pressure can be adjusted independently of each other in an electro-proportional manner, there is the option of adjusting the pressure at the working port assigned to the outflow route, independently of the pressure of the working port assigned to the inflow route. By programming the control of the respective electro-proportionally controllable valve element, the open-control ratio can be freely selected and adapted by adjustable parameters and/or adapted to the current load of the drive system during operation. In particular, the outflow pressure can be adjusted depending on the respective load of the working cylinder.

In advantageous exemplary embodiments, the respective valve element has a logic valve for setting the outflow volume.

Regardless of whether the respective electro-proportionally adjustable valve element is designed as a logic valve or, for instance, as a pressure relief valve having a spool design, the arrangement can be such that two valve elements are present, which, depending on the direction of motion of the drive system, determine the outflow pressure at one or the other working port of the drive system.

Preferably, the two valve elements are designed to close tightly and to be unlocked electrically. This means that a load-holding function can also be implemented in the system according to the invention.

In advantageous exemplary embodiments, the two electrically unlockable valve elements are designed as logic valves closing in a seat sealing manner. For the electrical unlocking of the two logic valves, at least the control pressure of an electro-proportionally actuatable control valve acts on their respective one control end, wherein a fluid connection between the outflow end of the drive system and a tank port or return port can be actuated at their respective further control end. In this arrangement, the logic valves each act as pilot-operated pressure relief valve that set the outflow pressure according to the electro-proportional setting.

In advantageous exemplary embodiments, sensors measure the inflow and outflow pressure, respectively, at the inflow and outflow ends of the drive system, respectively, and the sensors transmit the detected pressure values to a computer that controls the control valves to unlock the respective valve elements. In an advantageous further development, the computer, designed as a control unit, can automatically detect whether a load is applied to the drive system and the size of this load.

Based on this self-acting detection of the load, the control unit can optimize the parameters and control algorithms.

Advantageously, the arrangement is such that a switching valve, in particular a 4/3-way switching valve, takes on the direction selection function of the drive system.

Alternatively, omitting the switching valve, a pair, in particular a further pair, of logic valves can be used in a resolved valve design, which, designed to be seat sealing, can be electrically unlocked at their one control end by means of assigned control valves and, to implement the direction selection function at their respective further control ends, control a fluid connection between the respective inflow and outflow end of the drive system and a pressure supply. In this way, the braking function and direction selection function are integrated into a joint circuit arrangement in a resolved design.

Advantageously, the drive system can be formed by a working cylinder having a piston rod on which a load acts and which in operation has horizontally opposite directions of travel.

The respective valve element for setting the outflow volume flow can advantageously have a pressure relief valve, which is not designed as a logic valve, and can, for instance, be designed as a spool valve or as a seat valve. Irrespective of the above design, two valve elements equally formed can be provided.

With particular advantage, all logic valves used are designed as fluid components. The assigned valve pistons are therefore actuated hydraulically in accordance with the fluid pressure supplied by the respective assigned control valve.

The system according to the invention renders adjusting the outflow pressure as a function of the inflow pressure possible. In an advantageous further development, by means of programming the control unit optionally assigned to the valve element, the option can be created to freely select the type of dependency and adapt it by means of adjustable parameters before the system is put into operation. Alternatively, said dependency may be adapted to the drive system and/or its duty cycle during system operation.

The control device may be connected to a user interaction device for this purpose. This device guides the user during commissioning and parameterization of the system.

A control instance superordinate to the control unit may be provided. Such a control instance can provide the setpoint for the pressure control by the control unit.

BRIEF DESCRIPTION OF THE DRAWINGS

The invention is explained in detail below with reference to exemplary embodiments shown in the drawing. In the Figures.

DETAILED DESCRIPTION OF THE INVENTION

Based on the accompanying drawings, the invention is explained by means of examples for braking of a drive system 10 in the form of a working cylinder 20, the piston rod 14 of which is connected to a load 12. When the cylinder 20 is installed vertically, the system performs the load-holding function and, by building up the outflow of the pressure fluid operating the cylinder 20, the lowering brake function. When installed horizontally, the valve element permits the precise positioning of loads 12 of large inertia, also by building up the outflow. The system according to the invention can be used equally advantageously for braking other types of drive systems, for instance for traction drives or the like.

A motor-pump unit 24 is provided to supply the system, wherein the suction end 4 of said pump 24 draws fluid from a holding tank 2. The pump is connected to a tank port or return port T as the first input port of a switching valve via a return line 5, wherein said switching valve is designed as a changeover valve 22. The pressure end 7 of the pump is connected to the pressure port P as the second input port of the changeover valve 22 via a pressure line 9. At the output end, the changeover valve 22 has a utility port A and a utility port B. The changeover valve 22 in the form of an electromagnetically operated 4/3-way valve specifies the working direction "retract" or "extend" for the working cylinder 20 via its utility ports A, B, wherein the load 12 can in particular be lifted when the piston rod 14 is retracted and the load can be lowered when the piston rod 14 is extended. For this purpose, the changeover valve 22, in the switching position shown in FIG. 1, connects the utility port B to the pressure port P and the utility port A to the tank port T.

Figure 3:
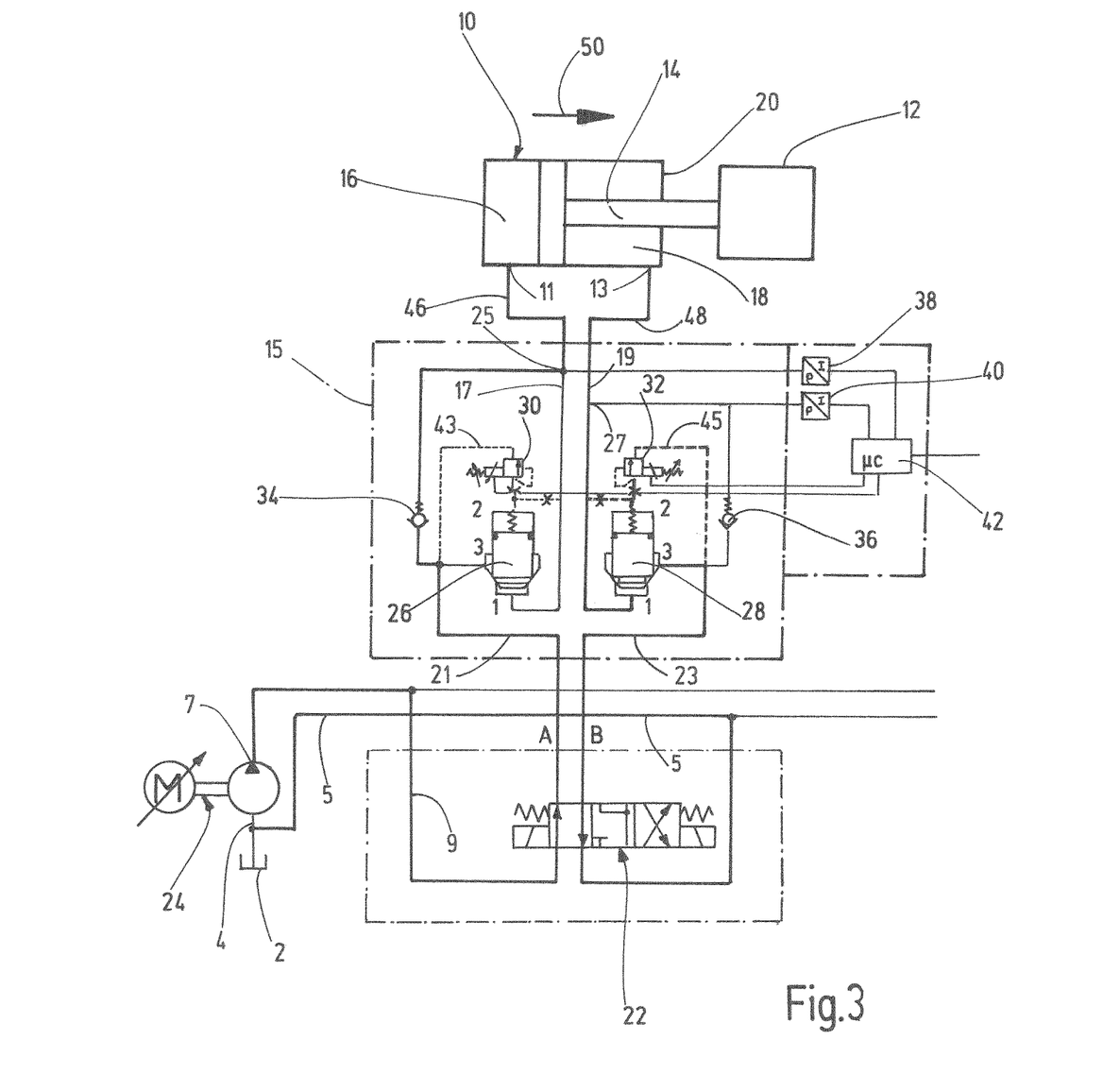
FIG. 3 shows a representation corresponding to FIG. 1, of the exemplary embodiment, wherein the operating state 'extend' is shown.

In the switching position of the changeover valve 22 shown in FIG. 3 for "extend", the utility port A is connected to the pressure port P and the utility port B is connected to the tank port T. When the changeover valve 22 is in a neutral center position, both utility ports A and B are connected to the tank port T. The utility ports A and B are connected to the working cylinder 20 via a valve arrangement 15, which on the one hand is connected to the utility ports A and B and on the end of the working cylinder 20 is connected to a port 11 at the piston chamber 16 and to a port 13 at the rod chamber 18 of the cylinder 20 via the fluid routes 46 and 48, respectively. In the valve assembly 15, the fluid route 46 continues through a connection line 17 to the valve port 1 of a first valve element, which is designed as a first logic valve 26. The fluid route 48 continues through a second connection line 19 to the valve port 1 of a second valve element, which is a second logic valve 28. The third valve port 3 of the first logic valve 26 is connected to the utility port A of the changeover valve 22 via an inflow-outflow line 21, whereas the valve port 3 of the second logic valve 28 is connected to the utility port B of the changeover valve 22 via a second inflow-outflow line 23.

A check valve 34 is inserted between a branch 25 of the connection line 17 and the valve port 3, wherein said check valve 34 blocks in the direction of the valve port 3 of the logic valve 26. In a corresponding manner, a check valve 36 is also inserted between the valve port 3 of the second logic valve 28 and a branch 27 at the connection line 19, wherein said check valve 36 also blocks in the direction of the valve port 3 of the assigned logic valve 28. From their second valve port 2, the logic valves 26 and 28 can be operated by electro-proportional actuation in such a way that they block the connection between the ports 1 and 3 in a seat sealing manner or open it accordingly to build up the outflow pressure from the assigned working chamber 16 or 18, wherein the piston chamber 16 is assigned to the logic valve 26 and the rod chamber 18 is assigned to the logic valve 28.

Figure 1:
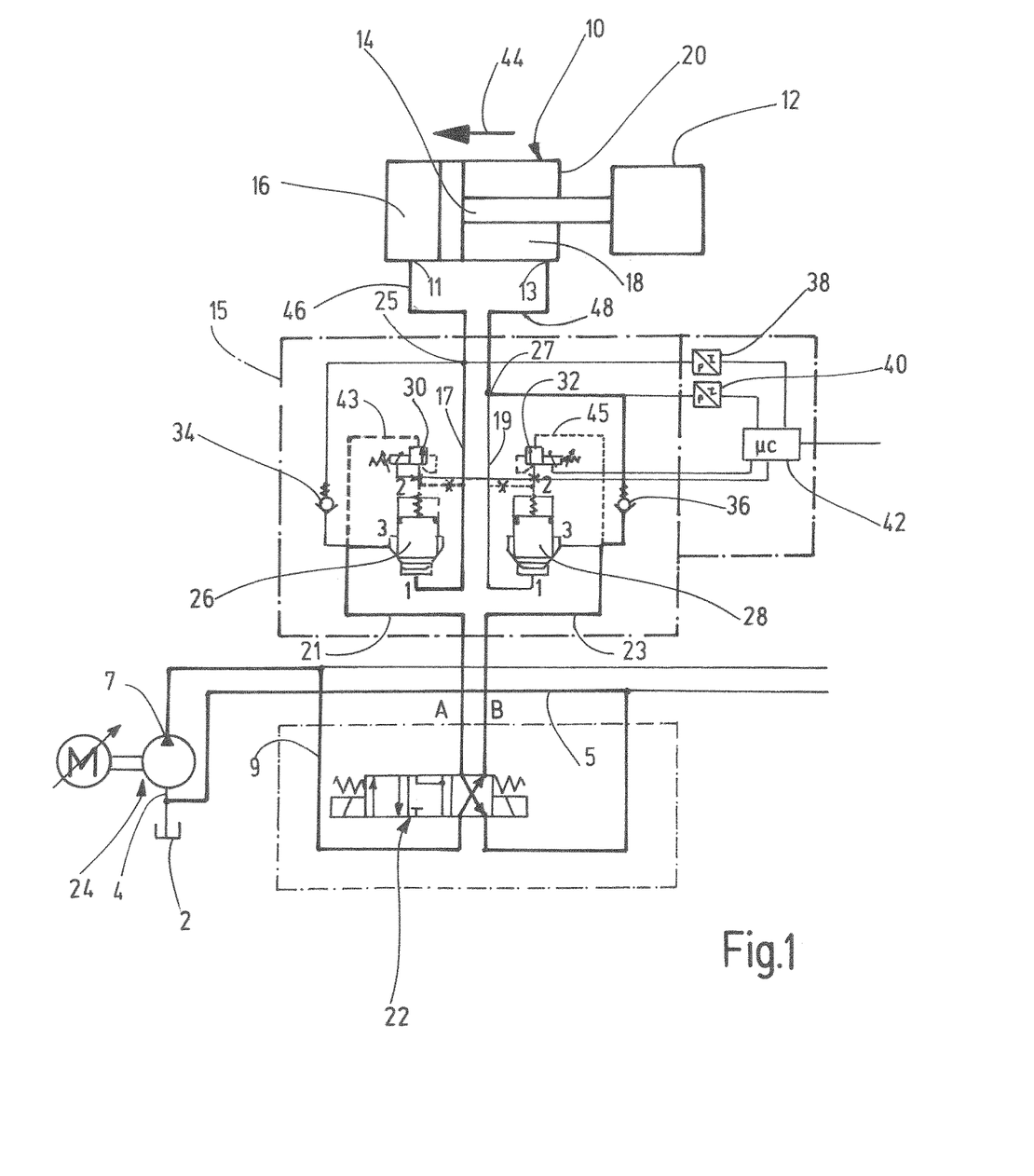
FIG. 1 shows a symbolic representation of the circuit of a first exemplary embodiment of the system according to the invention, wherein the operating state "retract" is shown and lines through which flow is active in this operating state are plotted using a thicker line.
Figure 2:
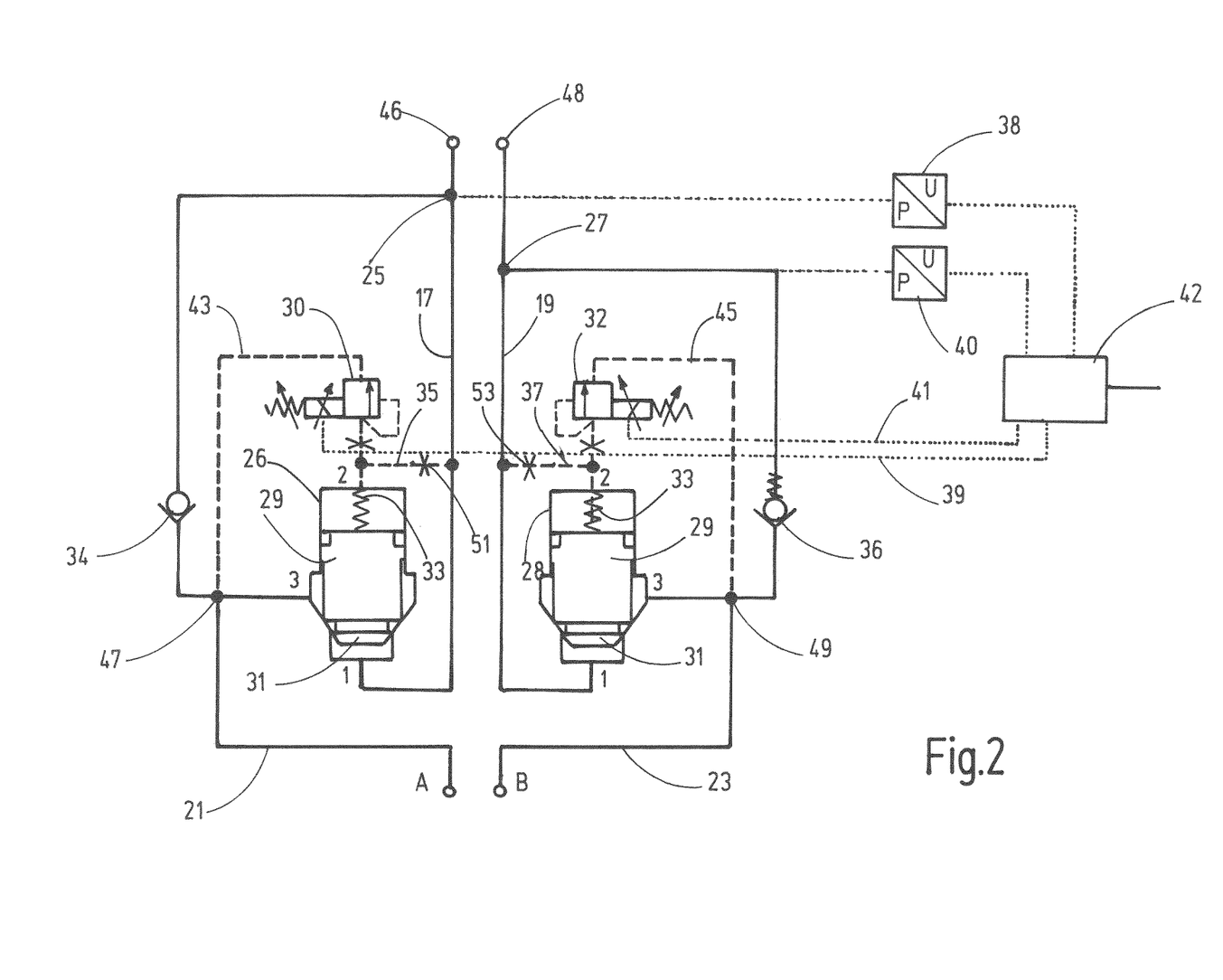
FIG. 2 shows a section of the circuit of FIG. 1, wherein the active flow lines are shown using an exaggerated thickness.

FIGS. 1 and 2 show the "retract" state for the motion of the load 12 in the direction of an arrow 44. For this purpose, the pressure port P is connected to the utility port B of the changeover valve 22, and the inflow continues to the fluid route 48 via the inflow-outflow line 23 and via the pressure-operated opening check valve 36 and via the branch 27, such that the pressurized fluid flows into the rod chamber 18 of the cylinder via the port 13. When the first logic valve 26 is actuated, fluid returns from the piston chamber 16 via the connection line 17 to the valve port 1 of the first logic valve and from its port 3 to the utility port A which is connected to the tank port T, of the changeover valve 22.

In the manner usual for logic valves, the logic valves 26 and 28 each have a control piston 29 in the form of a stepped piston, the piston step 31 of which in the blocking position closes the valve port 1 in a seat sealing manner. A pressure spring 33 and the pressure, also effective at the port 2, of a control line, which are designated by the numeral 35 for the logic valve 26 and by the numeral 37 for the logic valve 28 and are pressurized at the pressure of the connection lines 17 and 19, respectively, holds the logic valves 26, 28 in the blocking position in the not operated state. For electro-proportional unlocking for building up of the return flow that is made via the ports 1 and 3 of the logic valve 26 or 28 selected according to direction, the logic valves 26, 28 can each be actuated by an assigned electro-proportionally operated control valve or 32. For the electromagnetic operation, the control valve 30 is connected to an electronic control unit 42 via an electric connection 39, and the second control valve 32 is also connected to the control unit 42 via an electric connection 41, which includes a programmable computer. These process pressure signals from the pressure sensors 38 and 40, of which the sensor 38 determines the pressure at the line branch 25 and thus the pressure in the piston chamber 16, and the other sensor 40 at the branch 27 of the connection line 19 determines the pressure in the working chamber 18 of the cylinder 20. The control valves 30 and 32, which are at the input end connected to the valve port 2 and the control line 35 or 37 of the respective logic valve 26, 28 assigned thereto, are at the output end connected to the inflow-outflow line 21 or the inflow-outflow line 23, respectively, via a further control line. In the first control valve 30, this further control line is designated by the numeral 43 and is connected at a branch 47 to the inflow-outflow line 21. In the second control valve 32, the further control line is designated by the numeral 45 and is connected to a branch 49 of the inflow-outflow line. The control valves 30, 32 are each formed by a 2/2-way proportional valve.

In the "retract" operating state shown in FIGS. 1 and 2, the utility port B of the switching valve 22 has the pressure of the supply port P, which is effective through the inflow-outflow line 23, the opening check valve 36, and the fluid route 48 in the rod chamber 18 of the cylinder 20. From the piston chamber 16, the outflow flow passes through the fluid route 46 and the connection line 17 to the valve port 1 of the logic valve 26. The supply pressure P from the branch 49 via the control line 45 is also effective at the output end of the further control valve 32, the input of which is also pressurized at the supply pressure from the connection line 19 via the control line 47, such that at the valve port 2 of the logic valve 28 both the pressure of the spring 33 and the supply pressure are effective and the logic valve 28 is blocked.

The other logic valve 26, to whose valve port 1 the connection line 17 is connected and to whose valve port 3 the line 21 leading to the utility port A is connected, controls a built-up return flow from the connection line 17 to the utility port A via its ports 1 and 3. For this purpose, the control valve 30 is operated by a control signal supplied by the electrical connection 39 such that, by proportionally opening the flow from the control line 35 to the control line 43 pressurized at the tank pressure existing at the utility port A, the pressure of the control line 35, which is connected to the connection line 17 via an orifice 51, drops in accordance with the opening of the control valve 30, thereby reducing the closing pressure acting at the port 2 of the logic valve 26. Corresponding to the pressure reduction, the pressure of the connection line 17 effective at the valve port 1 causes an opening motion of the spool 29 for the built-up flow to the valve port 3, which is connected to the utility port A connected to the tank port T.

Figure 4:
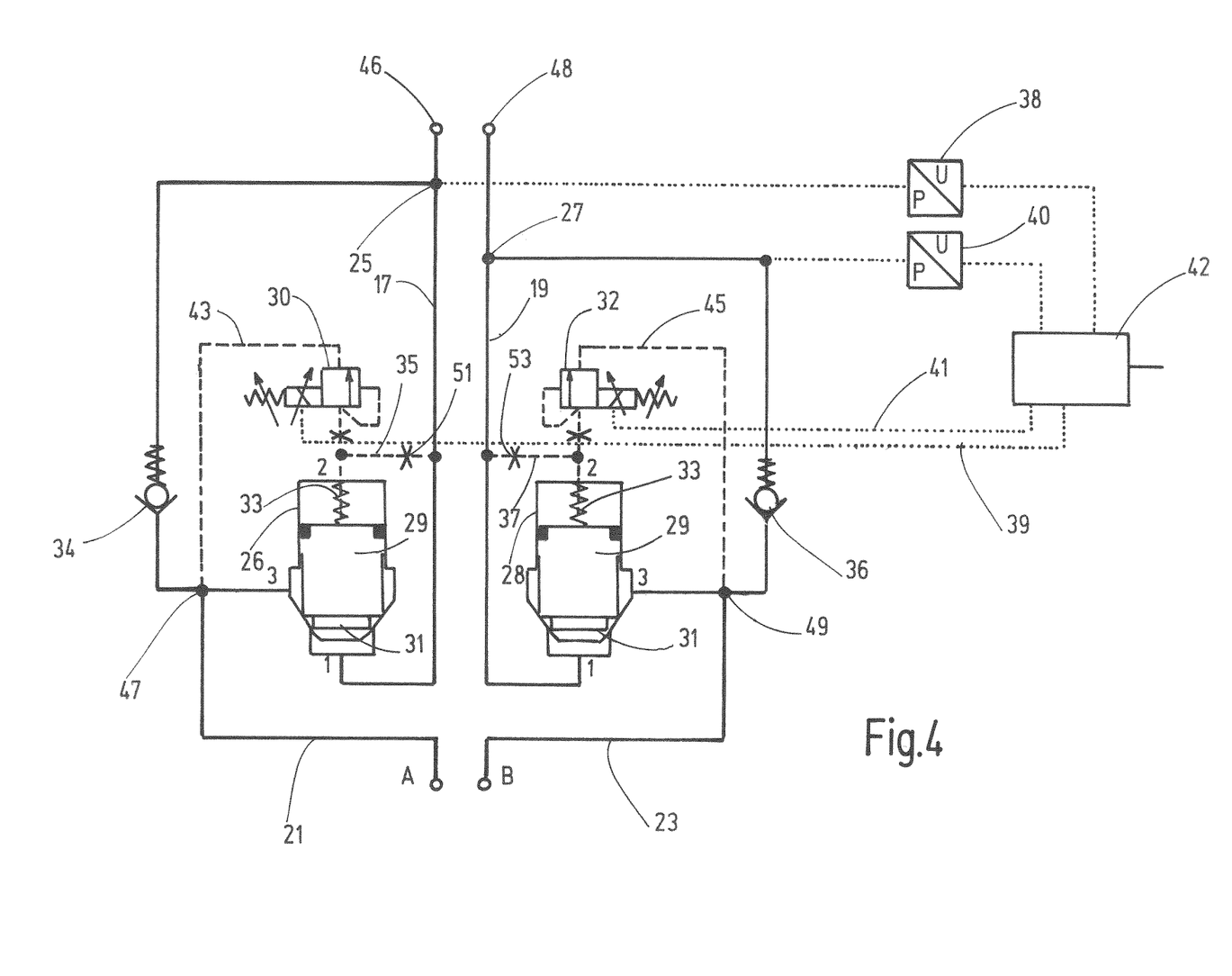
FIG. 4 shows a section of the circuit of FIG. 3, wherein active flow lines are drawn using an exaggerated thickness.

FIGS. 3 and 4 show, for the motion of the load 12 in the direction of an arrow 50, the "extend" operating state, in which the changeover valve 22 connects the pressure port P to the utility port A and the tank port T to the utility port B. The pressure-conveying utility port A is directly connected to the piston chamber 16 of the cylinder 20 via the inflow-outflow line 21 and the pressure-operated open check valve 34. The control valve 32 of the other logic valve 28 is now electro-proportionally operated for building up the return flow during the lowering process in the same way as described for the logic valve 26 in the "retract" state, such that the logic valve 28 in accordance with the control signals supplied to the control valve 32 from the control unit 42 is unlocked in such a way that a built-up return flow occurs from the port 1 of the logic valve 28 to the port 3 and further to the utility port B via the inflow-outflow line 23. For this purpose, the control line 37 leading to the port 2 of the logic valve 28 is connected to the connection line 19 via an orifice 53, which, like the orifice 51 for the logic valve 26, causes that pressure drop when the control valve 32 opens.

Based on the signals from the pressure sensors 38 and 40, which determine the pressures in the working chambers 16 and 18, the control unit 42 sets the outflow pressure by electro-proportional adjustment of the respective involved control valve 30 or 32 to the appropriate pressure value for the desired braking process, irrespective of the pressure corresponding to the load 12 involved, of the working cylinder 10. When the changeover valve 22 is set to its central switching position, which is located between the "extend" and "retract" positions, both utility ports A and B are connected to the tank port T, while the pressure supply port P is shut off. When the control valves 30, 32 are not operated, the same pressure is present at the valve ports 1 and 2 of the logic valves 26 and 28, respectively, in the case of the logic valve 26, the pressure of the connection line 17 and in the case of the logic valve 28 the pressure of the connection line 19, wherein the valve pistons 29 are each still loaded in the blocking direction by the compression spring 33. As a result, the logic valves 26, 28 block in a seat sealing manner, such that the load-holding function is implemented at this switching position.

Figure 5:
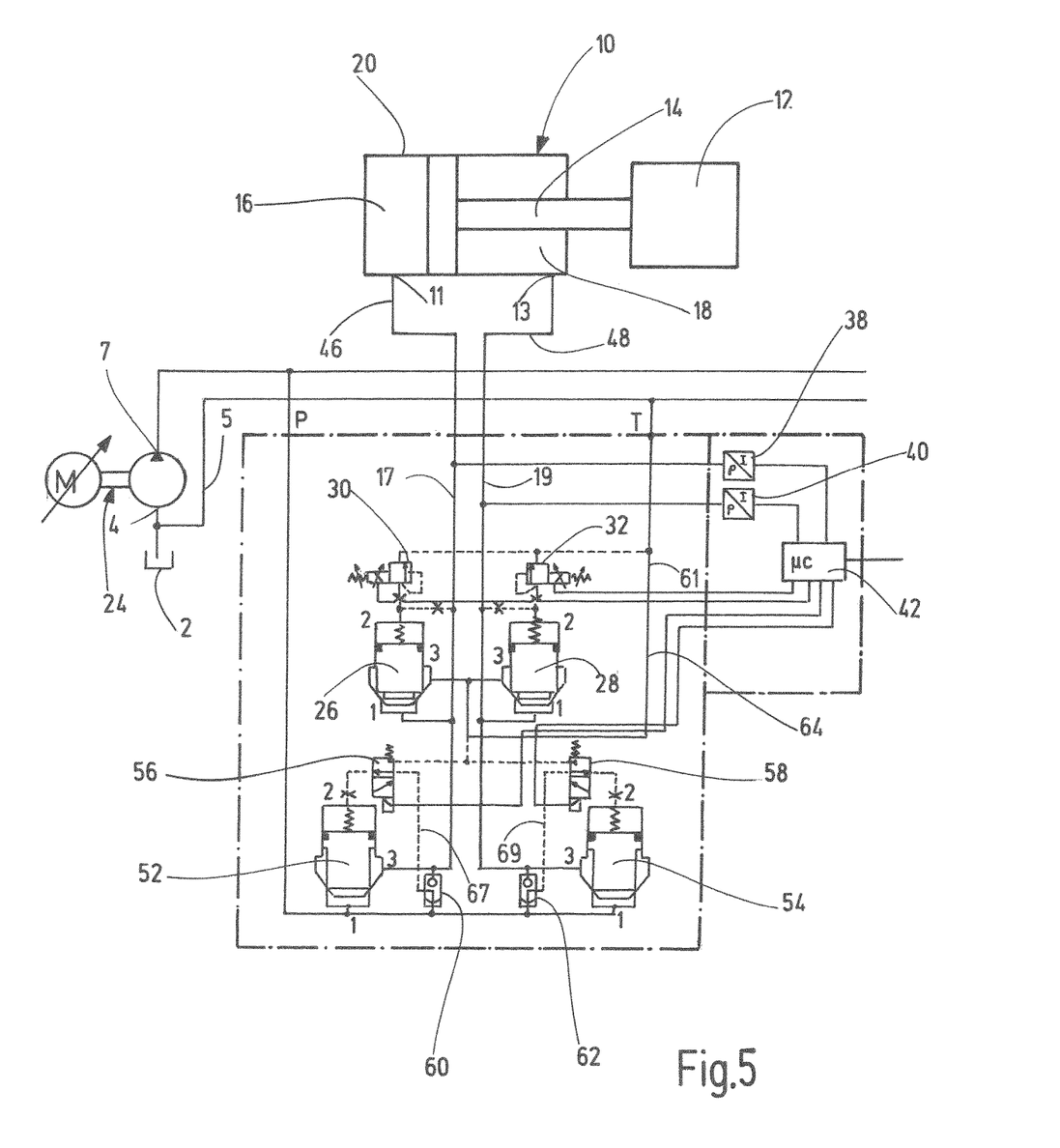
FIG. 5 shows a symbolic representation of the circuit of a second exemplary embodiment of the invention.
Figure 6:
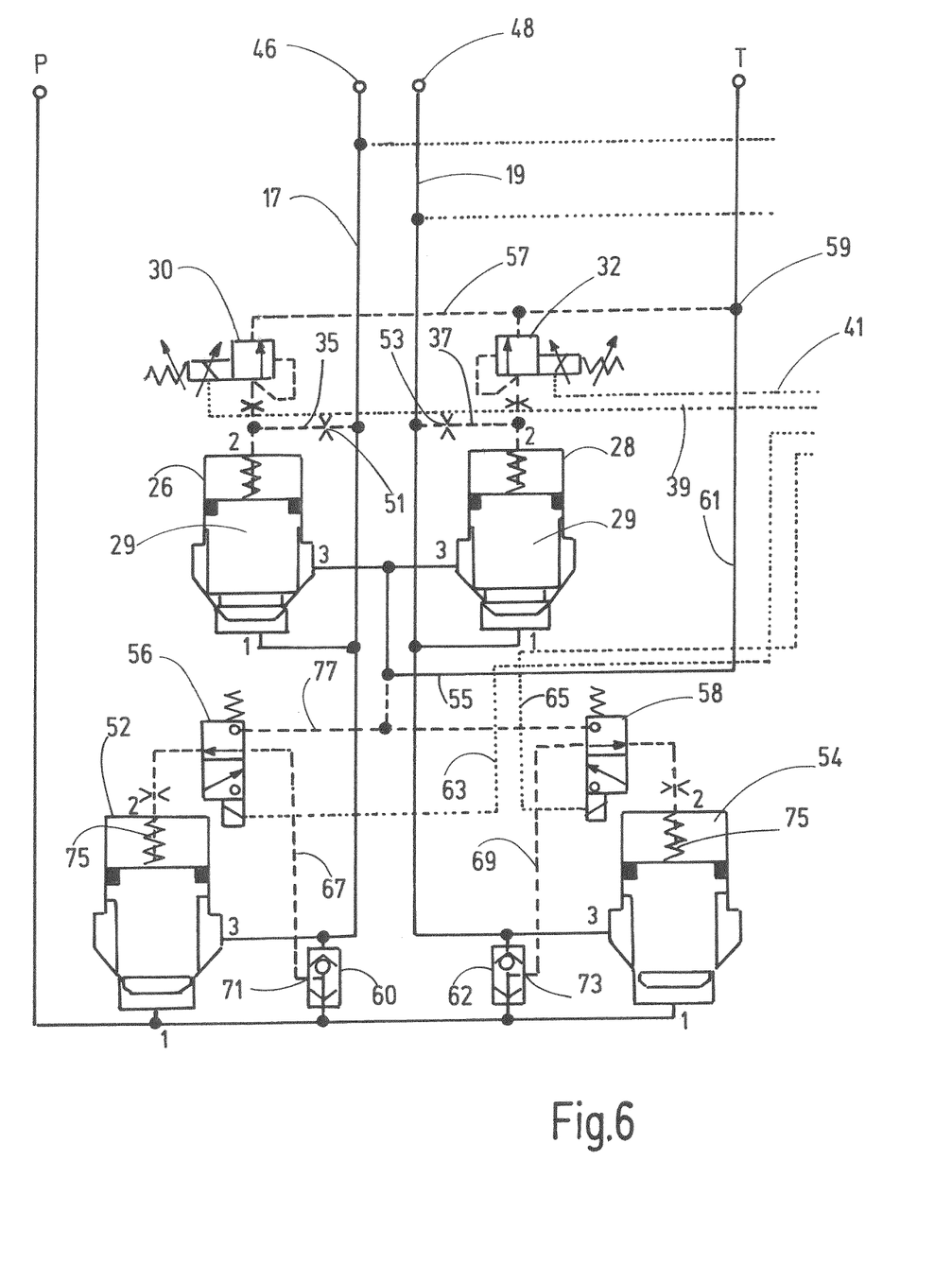
FIG. 6 shows a section drawn larger, of the circuit of FIG. 5.

FIGS. 5 and 6 show a second exemplary embodiment of the invention. Elements that functionally match those of the previous example are designated by the same reference numerals as above. Also, the circuit arrangement comprising the logic valves 26 and 28 is functionally equivalent to the circuit arrangement of the first exemplary embodiment, designated by the numeral 15. Accordingly, the valve ports 1 of the logic valves 26, 28 are connected to the connection line 17 or 19 and, depending on the unlocking state, control the return flow from the port 1 to the port 3. Unlike the first example, however, the ports 3 are jointly connected to the tank port T via a line 55. As a further difference, in the second example, the control lines 43 and 45 of the first example are merged at the output ports of the control valves 30 and 32 to form a joint control line 57, which is connected to a tank line 61 routed to the tank port T at a branch 59. As in the first example, the control valves 30 and 32 can be electro-proportionally actuated by means of the electrical connections 39 and 41, such that the logic valves 26 and 28 can be electro-proportionally unlocked in the same way as in the first example to preset the respective outflow pressure.

Unlike the first exemplary embodiment, in which, to select the working direction of the working cylinder 20, the changeover valve 22 connects the connection lines 17, 19 leading to the working cylinder 20 to the pressure supply port P or the tank port T, in the second exemplary embodiment the changeover valve 22 is replaced by another pair of logic valves 52 and 54. A control valve, designated by the numeral 56 for the logic valve 52 and 58 for the logic valve 54, is connected to the valve port 2 of each logic valve 52, 54. The control valves 56, 58 are electromagnetically operated switching valves in the form of 3/2-way valves, whose operating solenoids are connected to the control unit 42 via the electrical connections 63, 65.

FIGS. 5 and 6 show the control valves 56, 58 in the not operated switching state. There, they connect the valve port 2 of their respective assigned logic valves 52, 54 to a control line 67 or 69, of which the control line 67 is connected to the output 71 of a shuttle valve 60 and the control line 69 is connected to the output 73 of a shuttle valve 62. At the inflow end, the shuttle valve 60 is connected to the connection line 17 and to the pressure supply port P. The input end of the second shuttle valve 62 is connected to the connection line 19 and to the pressure supply port P. The control lines 67 and 69 therefore signal the respective higher pressure from pressure supply port P and the assigned connection line 17 or 19 to the assigned control valve 56. Therefore, when the control valves 56 and 58 are not operated, this pressure is applied to the valve port 2 of the logic valves 52, 54 such that, interacting with a compression spring 75 loading the valve piston, the control valves 56 and 58 keep the logic valves 52, 54 blocked.

At the first logic valve 52, the pressure supply port P is connected to the valve port 1 and the connection line 17 is connected to the valve port 3. Therefore, when the logic valve 52 is blocked, the connection line 17 is disconnected from the pressure supply port P. In the second logic valve 54, the first valve port 1 is also connected to the pressure supply port P, whereas the valve port 3 is connected to the connection line 19. Therefore, when the logic valves 52 and 54 are blocked, both connection lines 17 and 19 are disconnected from the pressure supply port P. For the "retract" operating direction, the pressure supply port P has to be connected to the connection line 19. This is done by unlocking the second logic valve 54, whose valve port 1 is connected to the pressure supply port P and whose valve port 3 is connected to the connection line 19.

By energizing the control valve 58, the latter connects the valve port 2 to a connection line 77, which in turn is connected to the tank port T via the line 55 and the tank line 61. The valve port 2 of the logic valve 54 is therefore depressurized, such that the latter is pre-loaded to the closed position by the spring 75 only, such that the logic valve 54 opens due to the pressure acting on the valve port 1, and in this way the pressure supply port P gets connected to the connection line 19 via the valve port 3, and the system operates in the "retract" working direction. On the other hand, if the control valve 56 of the first logic valve 52 is unlocked by being energized, via its valve ports 1 and 3 the supply port P gets connected to the connection line 17, such that the system operates in the "extend" working direction. The "selection of the working direction" function is therefore integrated into the valve arrangement, in which the logic valves 26 and 28 specify the outflow pressure in the same way as in the first example.

Figure 7:
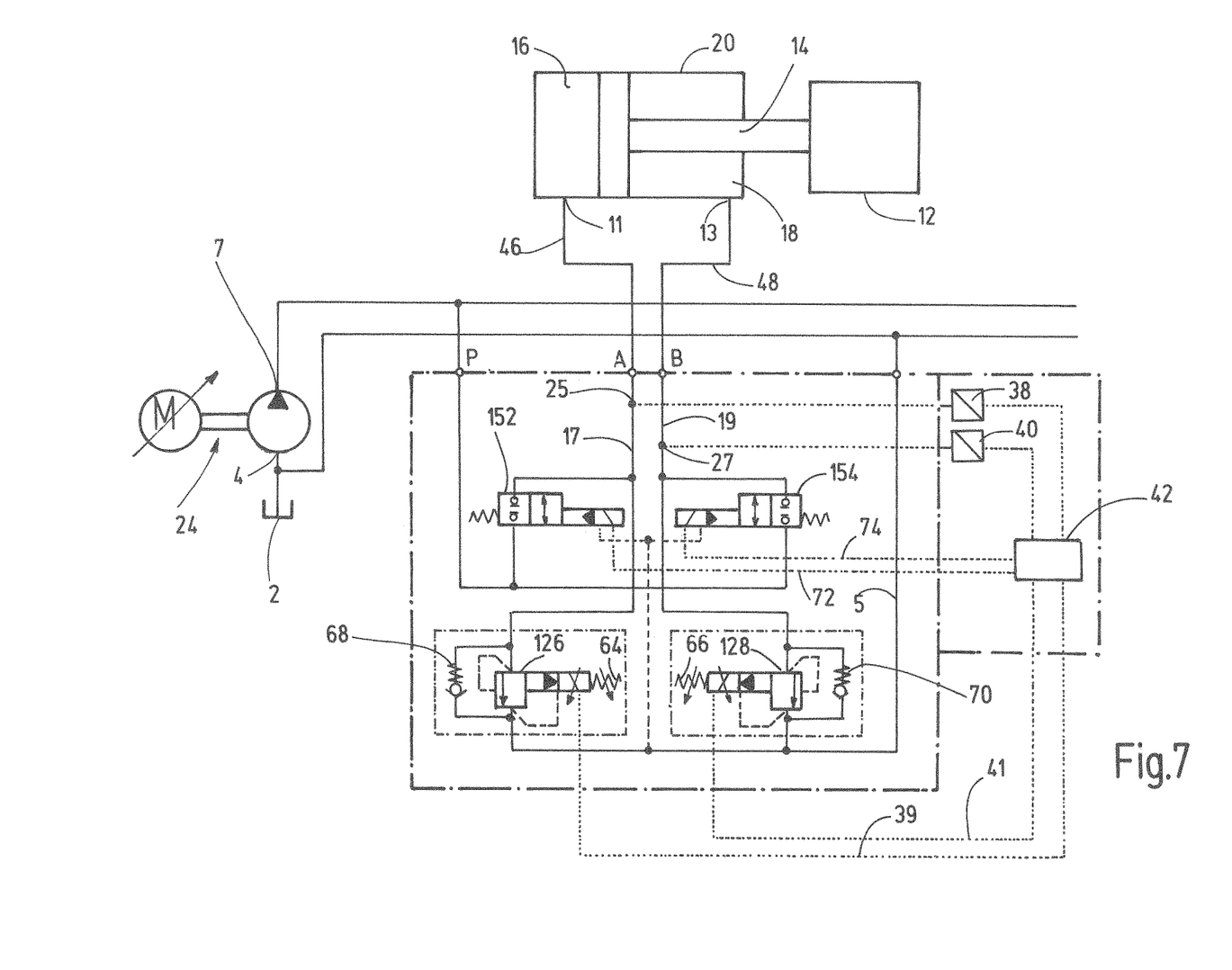
FIG. 7 shows a symbolic representation of the circuit of a third exemplary embodiment of the system according to the invention.

FIG. 7 shows a third exemplary embodiment of the invention. Here, elements that functionally match those of the first two exemplary embodiments are designated by the same reference numerals as before. Structurally different elements, which nevertheless have functional similarities, are designated by reference numbers incremented by 100.

In the system according to FIG. 7, two identically designed 2/2-way valves 152, 154 are provided, which are assigned to the inflow, in that the working chamber 16 or 18 can be pressurized using the respective 2/2-way valve 152 or 154. In contrary assigned to the outflow, two electro-proportionally operated valve elements, which are also of identical design, are designed as pressure relief valves 126, 128.

The two 2/2-way valves 152, 154 assigned to the inflow, are designed as seat valves, to which at the inflow end the pressure of the pressure port P is applied. In the not-operated switching state, shown in the drawing, of the 2/2-way valve 152 or 154 the connection from the pressure port P is blocked in the direction of a connection line 17 or 19 connected to the 2/2-way valve 152 or 154 at the outflow end, which connection line 17, 19 is connected to the utility port A or B, respectively. The two connection lines 17 and 19 are disconnected from each other.

To the connection lines 17, 19 the two pressure relief valves 126, 128 are also connected, the input ends of which are thus each fluidically connected to the utility port A and B, respectively. At the output end, however, the pressure relief valves 126, 128 are connected to the tank port T via the return line 5.

The connection lines 17, 19 each have a line branch 25 or 27, to which a pressure sensor 38 or 40 is connected.

The pressure signals from the pressure sensors 38, 40 are reported to a control unit 42, which is connected to electromagnetic actuators of the 2/2-way valves 152, 154 via electrical connections 72, 74 on the one hand and on the other hand via electrical connections 39, 41 to electromagnetic actuators of the electro-proportionally operable pressure relief valves 126, 128.

The fluid, which is routed to the tank port T via the return line 5, is used to lubricate the electromagnetic actuators of both the pressure relief valves 126, 128 and the 2/2-way valves 152, 154.

The electromagnetic actuators of the 2/2-way valves 152, 154 each act against a force of a compression spring when operated.

In contrast, the two electromagnetic actuators of the pressure relief valves 126, 128 are each supported by the force of a compression spring 64 and 66, respectively, which can be adjusted. This compression spring force and the operating force by the electromagnetic actuator counteract a pressure-proportional force, which is applied to a piston surface of the pressure relief valve 126 or 128 designed as a spool valve and which is derived from the pressure in the connection line 17 or 19 and in this way tries to displace the piston of the pressure relief valve 126 or 128 in the opening direction, i.e., to increase the passage cross-section of the pressure relief valve 126 or 128.

A check valve 68 or 70 is connected in parallel to the respective pressure relief valve 126 or 128, wherein said check valve 68 or 70 blocks in the direction from the connection line 17 or 19 to the return line and opens in the opposite direction, to ensure that the connection lines 17, 19 are completely fluid-filled under all circumstances.

Below, the lowering brake function, in which the piston rod 14 is extended, is described.

The one 2/2-way valve 152, shown on the left in the drawing, is electromagnetically operated by the corresponding "extend" command from the control unit 42, such that it is switched to a passage position, in which the pressure port P is connected to the utility port A and the piston chamber or working chamber 16 is pressurized. The control unit 42 holds the other 2/2-way valve 154 in the blocking position. Simultaneously or at least shortly after the pressurization of the piston chamber or working chamber 16 assigned to the utility port A, the pressure relief valve 128 shown on the right in the drawing is electro-proportionally operated for building up the return flow during the lowering operation, such that a built-up return flow from the working chamber 18 to the tank port T occurs in accordance with the control signals supplied by the control unit 42. Based on signals from the pressure sensors 38 and 40, which determine the pressures in working chambers 16 and 18, the control unit 42 adjusts the outflow pressure to the appropriate pressure value for the desired braking operation based on the electro-proportional adjustment of the pressure relief valve 128.

The piston rod 14 is retracted in the same way as it is extended, in which case the 2/2-way valve 154 shown on the right in the drawing ensures the inflow, wherein the pressure relief valve 126 shown on the left in the drawing ensures the outflow. In the not operated state, the two pressure relief valves 126, 128 go into the blocking position; no prompting by the control unit is required for them to do so.

The invention claimed is:

1. A system for braking a hydraulic working cylinder which is configured to be driven, for a motion of a piston rod of the hydraulic working cylinder, connectable to a load, in two opposite directions, separating a first utility port of the hydraulic working cylinder from a second utility port of the hydraulic working cylinder connectable to a pressure source and a tank port or a return port, the system comprising:
   logic valves; and
   electro-proportionally actuatable control valves,
   wherein:
   the system is configured to control, by an electro-proportional adjustment of one of the logic valves, an outflow volume flow of the hydraulic working cylinder such that an outflow pressure is decoupled from the motion of the piston rod of the hydraulic working cylinder and coupled to an inflow pressure so as to lower the inflow pressure for a motion of the hydraulic working cylinder;
   the logic valves are configured to determine, depending on a direction of the motion of the piston rod of the hydraulic working cylinder, the outflow pressure at the first utility port of the hydraulic working cylinder or the outflow pressure at the second utility port the hydraulic working cylinder;
   the logic valves are configured to be spring closed and electrically unlocked;
   the logic valves are configured to close seat-sealingly; and
   the system is further configured to:
   (i) for electrical unlocking, have at least a control pressure of one of the electro-proportionally actuatable control valves act on a first control end of the one of the logic valves;
   (ii) control, on a second control end of the one of the logic valves, a fluid connection between the first utility port of the hydraulic working cylinder or the second utility port of the hydraulic working cylinder and the tank port or the return port; and
   (iii) connect the pressure source to one of the first of the hydraulic working cylinder or the second utility port of the hydraulic working cylinder by bypassing the other of the logic valves, which is held in a spring closed position.

2. The system of claim 1, further comprising:
   sensors configured to: (i) measure the inflow pressure at the first utility port of the hydraulic working cylinder and the outflow pressure at the second utility port of the hydraulic working cylinder; and (ii) transmit detected pressure values to a computer,
   wherein, the computer is configured to control the one of the logic valves or the one of the electro-proportionally actuatable control valves to unlock the one of the logic valves.

3. The system of claim 1, wherein the system is configured to lower the inflow pressure to a level necessary for the motion of the hydraulic working cylinder.

4. The system of claim 1, further comprising a switching valve configured to take on a direction selection function for the hydraulic working cylinder, wherein the system is configured to perform actuation of the logic valves independently of the switching valve.

5. The system of claim 4, wherein the switching valve is a 4/3-way switching valve.

6. The system of claim 1, further comprising:
   additional logic valves in a resolved valve configuration,
   wherein:
   each of the additional logic valves is configured to: (i) be seat sealing; (ii) be electrically unlocked at a first control end thereof by an assigned control valve; and (iii) control the fluid connection between a pressure supply and the first utility port of the hydraulic working cylinder or the second utility port of the hydraulic working cylinder, so as to implement a direction selection function at a second control end thereof.

7. The system of claim 6, wherein the additional logic valves are fluid components.

8. The system of claim 1, wherein the piston rod has horizontally opposite directions of travel during operation.

9. The system of claim 1, wherein the logic valves are fluid components.

* * * * *